Nov. 2, 1943. C. STRAUSS 2,333,618
PLASTIC SCREEN MATERIAL AND METHOD OF MAKING THE SAME
Filed Aug. 7, 1941
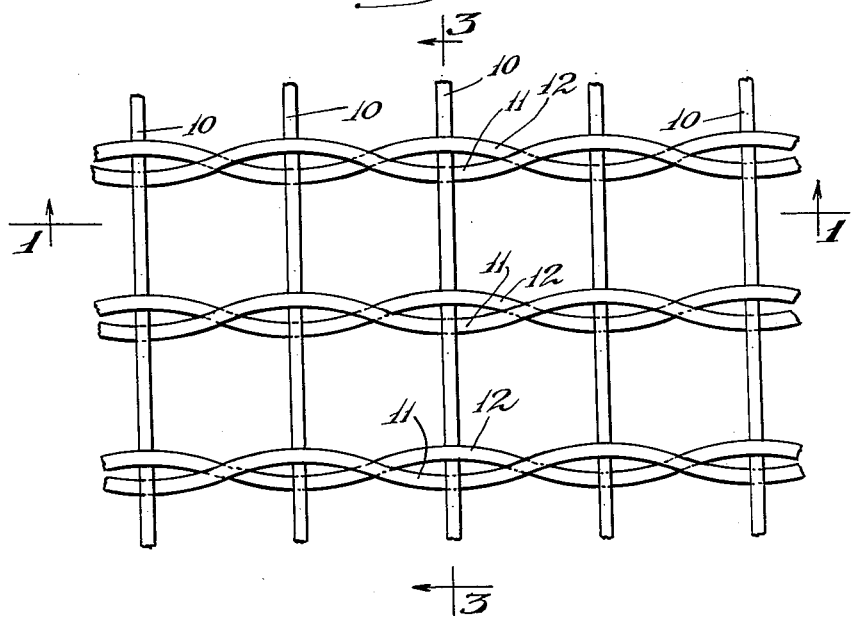
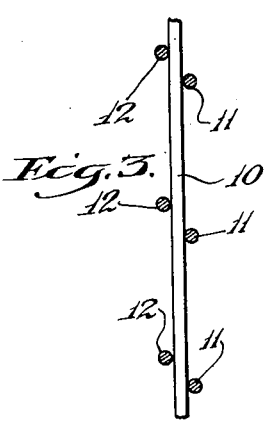 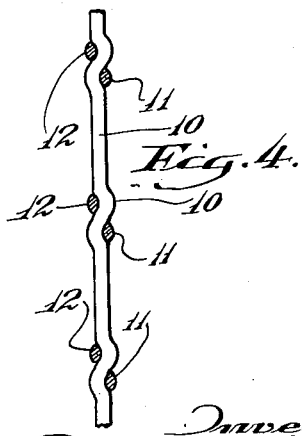
Inventor:
Charles Strauss
By Lee J. Gary
Attorney Patented Nov. 2, 1943

2,333,618

UNITED STATES PATENT OFFICE 2,333,618

PLASTIC SCREEN MATERIAL AND METHOD OF MAKING THE SAME

Charles Strauss, Chicago, Ill., assignor to Arvey Corporation, Chicago, Ill., a corporation of Illinois Application August 7, 1941, Serial No. 405,826

4 Claims. (Cl. 139—420)

This invention relates to improvements in screen material and particularly to a mesh fabric formed of plastics.

Screen materials of metallic wire and nettings or mesh fabric formed of textiles, and their multiple uses are of course well known in the art, together with various methods of forming or weaving such materials and miscellaneous supplemental or auxiliary setting or finishing steps or treatments for particular purposes.

It is an object of this invention to provide a novel screen material which may be used as an effective substitute for either metallic or textile mesh materials with attendant advantages and economies in many instances and applications of such material in industrial use.

For example under conditions of national emergency where the use of metals or their supply is restricted, or under the contingency of such possible restriction matters of supply and economy become an important consideration, my novel screen or mesh fabric formed of well known plastics or synthetic resins may readily and economically be substituted for such metallic screens. At the same time my novel screen material has many advantages over metallic screens at all times since plastics may be selected to withstand conditions of weathering and atmospheric moisture, and to resist acidic and alkaline materials, both weak and strong, and even many organic solvents. Also as distinguished from textile fabric netting which lacks body and tensile strength, and without additional treatment or impregnation is subject to deterioration due to absorption of atmospheric moisture, requires excess bulk for strength and in general is not satisfactory for many screening and filtering purposes, my screen material which is formed of non-fibrous plastic strands can be provided in high tensile strength, low bulk, firm yet flexible body, and is free from general weathering and moisture absorption effects.

Other objects relate to details of construction and attendant advantages which will be apparent from a consideration of the following specification and drawing, wherein:

Fig. 1 is an enlarged and generally diagrammatic section taken on the line 1—1 of Fig. 2 of a woven screen formed of non-fibrous plastic strands in accordance with my invention.

Fig. 2 is an enlarged generally diagrammatic fragmentary surface view of the screen shown in Fig. 1.

Fig. 3 is a section on the line 3—3 of Fig. 1.

Fig. 4 is a view similar to Fig. 3 diagrammatically illustrating the screen in such section when subjected to surface deformation.

In general I form my screen material from cut or extruded non-fibrous strips or strands composed basically of thermoplastic resin, and preferably in the form of rod-like extruded strands. For this purpose the material in such strands should have a degree of flexibility suitable for weaving into the form of a mesh, and it will be understood that plastic material as herein contemplated includes the various suitable resins of commerce in the modified and plasticizer compounded forms. Thus I may use rod-like strands of cellulose acetate, polymerized vinyl acetate, polymerized vinyl chloride or their copolymers, and particularly the polymerized vinylidine chloride resins and many other plastics well known in the art capable of being formed in rod-like strands. Thus although I may use a wide variety of plastics, I have found vinylidine chloride eminently suitable for the greatest variety of screening and mesh material uses, since it has a tensile strength of between 30,000 to 60,000 pounds per square inch, has a high degree of flexibility, is possessed of toughness and abrasion resistance, high dielectric strength, great climatic resistance, and is not affected by either weak and strong acids and alkalies and is even highly resistant to organic solvents.

The drawing illustrates a screen or mesh fabric woven of non-fibrous, rod-like plastic strands, and for the purpose of making use of conventional weaving looms, I find strands of vinylidine chloride particularly suitable since they have good flexibility and may be used in a variety of caliper thicknesses. Thus I may in the specific form illustrated form a weave composed of the filler strands 10 and the double, crossed warp strands 11 and 12. This particular form of weave tends to hold the filler strands in more definite spaced apart relationship warpwise as the fabric comes off the loom, which is desirable due to the smooth surface character of the strands and the open weave.

If it becomes desirable by reason of intermediate handling of the formed screen or mesh fabric, the longitudinal edges thereof may be bound by means of a pressure sensitive adhesive tape, by heat sealing, or otherwise, as it comes off the loom, or on being cut into commercial lengths.

In order to additionally interlock the warp and filler strands, particularly against lateral movement of the warp strands, I may subject the woven screen material to pressure, preferably between rolls to deform the strands at their junctures, as illustrated in Fig. 4. This may be carried out as the mesh comes off the loom in a continuous operation, or may be done later, and be done at atmospheric temperature and at a pressure of 2500 to 5000 pounds per square inch. The interlocking distortion may also be carried out at a temperature above atmospheric, such as well below the softening point of the plastic and at approximately its heat distortion point, with mild pressure on the order of 250 to 500 pounds per square inch. When heat is used in such distortion it may suitably be supplied by means of a heated roll in a series of pressing rolls.

It will be understood that, although not illustrated, other forms of weave may be used including a simple single warp and filler strand, and that such weaving is not confined to the use of a loom. In addition to the foregoing described deformation step, or in place thereof, I may more firmly interlock the warp and filler strands by adhesive means. For such purpose various resins both thermoplastic and thermosetting such as the urea or phenol formaldehyde resins, vinyl synthetic resins, cellulosic derivatives, and the like in the form of solvent solutions or lacquers may be applied to the woven fabric, for example by dipping or spraying, and the solvent evaporated. Such adhesives or bonding agents being selected for their compatability with the plastic of which the fabric is formed, and the use to which it is to be subjected, and are applied in an amount sufficient to bond the strands at their intersections without closing the meshes.

It will readily be apparent from the foregoing that my novel fabric may be used for door and window screens, for fences, for screening and separating various particles, as filter fabric for separating solids from liquids, and for many other and related uses. One particular use for my novel mesh fabric is as a reinforcing medium for plastic film material as more fully set forth in my copending application Serial No. 405,827, filed August 7, 1941.

I claim as my invention:

1. A woven mesh fabric composed of non-fibrous plastic strands, the filler strands thereof being held in spaced apart relationship to each other by crossed warp strand pairs, the said strands being deformed at their intersections providing interlocking strand engagement.

2. A woven mesh fabric composed of unitary non-fibrous thread-like strands of vinylidine chloride, the filler strands thereof being held in spaced apart relationship to each other by spaced apart crossed warp strand pairs, the said strands being deformed at their intersections providing interlocking strand engagement.

3. The method of forming a mesh fabric composed of non-fibrous plastic strands which comprises weaving well spaced warp strand pairs in crossed relationship with well spaced individual filler strands and subjecting said woven material to rolling pressure sufficient to deform the strands at their intersections to maintain each of the filler strands and each of the warp strand pairs in spaced apart relationship and the warp strands and filler strands in interlocking engagement with each other.

4. A woven mesh weather and moisture absorption resistant screen fabric composed of non-fibrous plastic strands, the filler strands thereof being held in spaced apart relationship to each other by spaced apart warp components each composed of a pair of crossed strands, said strands being in deformed interlocking engagement at their intersections, the mesh openings of said fabric being greater than the width of its components, said fabric being of relatively high tensile strength, low bulk and of firm yet flexible body.

CHARLES STRAUSS.